Patented Dec. 23, 1947

2,433,227

UNITED STATES PATENT OFFICE 2,433,227

TREATMENT OF LIGNIN SUBSTANCES

Harry F. Lewis and Irwin A. Pearl, Appleton, Wis., assignors, by mesne assignments, to Sulphite Products Corporation, Appleton, Wis., a corporation of Wisconsin No Drawing. Application May 17, 1944, Serial No. 536,037

1 Claim. (Cl. 260—521)

Our invention relates to an improvement in processing lignin, which has significance in connection with the utilization of the waste from pulp mills. The main constituent of such waste, in connection with which difficulties in disposal are encountered, is lignin, which is present as such or in various chemical combinations, but is not ordinarily in a form capable of any beneficial use, as it comes from the pulp-making process. The word "lignin" as employed herein is intended to include the various forms of a closely related class of compounds derived from lignocellulose, as it occurs in the plant, or in the various slightly altered and combined forms resulting from the conventional pulp making process in which the cellulose is separated. The applicability of the procedures detailed hereinafter to these various well known forms will be obvious to those skilled in the art.

We have discovered that the procedure outlined hereinafter is capable of transforming a large percentage of such material into a variety of usable materials of commercial value.

According to the invention, the lignin is subjected to the mild oxidizing action of mercuric oxide in hot alkaline solution, and the products of the resulting reaction may be separated in various ways to secure the valuable products.

Illustrative examples, according to the invention, are as follows:

EXAMPLE I

Dry mercuric oxide

About 240 parts of sodium hydroxide are dissolved in about a thousand parts of water and about 400 parts of dry mercuric oxide are stirred into the hot solution. To this hot bath we add lignin, preferably in the form of the basic calcium lignosulfonate (such as is described in U. S. Patent 1,699,845, issued January 22, 1929, to Guy C. Howard). About a hundred parts of such material are stirred into the bath and the mixture is heated to boiling under reflux with continued stirring, for a suitable period which may vary from about 3 to about 7 hours.

After cooling, the reaction mixture is acidified with sulphur dioxide, which causes a gray precipitate and liquid mercury to settle to the bottom. This precipitate is separated by filtration and may be washed with sulphur dioxide water and returned to any suitable mercury recovery system, where the mercury may be oxidized again for cyclic use.

The filtrate is first acidified with a strong acid, such as sulphuric acid, and boiled or aspirated to remove dissolved sulphur dioxide. Then the acid solution is extracted with a water-immiscible solvent such as ether or benzene. This ether extract contains all the desired products, which include chemical compounds of several different types. The ether extract is first further extracted with an aqueous solution containing about 20% of sodium bisulfite to remove solubles therein. Thereafter the remaining material is extracted with an aqueous solution containing about 8% of sodium bicarbonate, and this extract will contain acidic materials. Thirdly, the remainder is extracted with about 5% aqueous caustic soda and this extract will contain phenolic materials. And, finally, neutral materials will still remain in the ether, so that the products have been separated into 4 fractions.

The first fraction containing the sodium bisulfite solubles mentioned above will be found to consist essentially of vanillin and acetovanillone, and amounts to about 12% of the lignin employed. The second or acidic fraction is almost entirely vanillic acid and amounts to about 35% of the original lignin. The third or phenolic fraction includes 3% to 4% of vanillin, and some guaiacol. The neutral substances amount to about 5%.

EXAMPLE II

Hot fresh mercuric oxide at atmospheric pressure 1400 parts of mercuric chloride is dissolved in about 5000 parts of hot water and to this solution is added 1000 parts of sodium hydroxide dissolved in 1250 parts of water, with vigorous stirring. To the resultant suspension add 250 parts of basic calcium lignosulfonate and boil under reflux about 17 hours, during which time the bright orange color will change to olive green. Allow the reaction mixture to cool and acidify with sulfur dioxide. This will cause the coloration to disappear with separation of a gray sediment and of liquid mercury.

Subject the mixture to continuous extraction with ether.

The remaining aqueous solution is then filtered and the filtrate acidified with dilute sulfuric acid and aspirated to remove sulfur dioxide. At this point a light brown precipitate of degraded lignin separates out.

Continuous ether extraction of the solution acidified with sulfuric acid secures the rest of the products. Both ether extractions are further processed by successive extractions as in Example I to yield the same four fractions. But the treatment of Example II gives the product in relatively different proportions, yielding: 28.8% aldehydes, 26.0% acids, 7.8% phenols, and 1.7% neutral product.

EXAMPLE III

*Cold fresh mercuric oxide*

To a solution of 1590 parts of mercuric acetate in about 5000 parts of cold water, add with stirring a cold solution of 400 parts of sodium hydroxide in 2000 parts of water. This gives a light yellow orange mixture which should be stirred briefly and allowed to stand, and washed several times by decantation. This material is stirred up in a solution of 800 parts of sodium hydroxide and 5000 parts of water, and 250 parts of basic calcium lignosulfonate (containing 150 parts of lignin) are added gradually, and the mixture is boiled for 12 hours under reflux and allowed to cool. The cold mixture is filtered and the precipitate washed and the washings combined with the filtrate.

On acidifying this filtrate first with sulfur dioxide and then with sulfuric acid, as in Example II, and making an extraction as in Example I after each acidification, there was obtained a yield of 19.0% aldehydes, 39.2% acids, 7.0% phenols, and 1.4% neutrals.

The comparative results from the different procedures are shown in the following table.

Table

| | Example I | Example II | Example III |
|---|---|---|---|
| | Per cent | Per cent | Per cent |
| Aldehydes | 12.2 | 28.8 | 19.0 |
| Acids | 35.0 | 26.0 | 39.2 |
| Phenols | 3.5 | 7.8 | 7.0 |
| Neutrals | 5.2 | 1.7 | 1.4 |
| Totals | 55.9 | 64.3 | 66.6 |

The mercury used in the above processes may be readily recovered. The following preferred processes are illustrative.

(a) The gray powder material and mercury are first digested (heated to boiling) with an excess of concentrated sulfuric acid. This treatment oxidizes any traces of organic material present and converts mercury (Hg) or oxides of mercury ($Hg_2O$, $HgO$), etc., into mercuric sulfate. The resulting solution containing mercuric sulfate (along with a little $CaSO_4$), may be concentrated if desired, or be used as such in the preparation of a fresh batch of mercuric oxide.

(b) In an alternative process, the residues obtained are first heated with dry calcium oxide. The temperature used is sufficient to distill off the mercury which is collected in accordance with standard practices. The mercury is next dissolved in concentrated sulfuric acid. The mercuric sulfate solution obtained is then converted into the desired freshly precipitated mercuric oxide by addition of sodium hydroxide in accordance with the above examples. A preferred modification in both (a) and (b) above is to heat the mercuric sulfate solution with sodium chloride. The resulting mercuric chloride formed is then converted into the freshly precipitated oxide by treatment with caustic alkali.

The present process appears to be operative on any lignin or lignin-containing substance, including ordinary wood, and any lignin-containing material derived from any source. We have secured outstanding results with cellulose-free lignin compositions such as found in waste pulping liquors, and especially with such a composition as the calcium ligno sulfonate described in U. S. Patent 1,699,845 or 1,856,558. It appears to be equally applicable to soft wood lignin or to lignin from hard woods such as poplar, beech, maple, etc. In general, somewhat higher percentage yields are secured with hard wood lignin, which gives material percentages of syringyl compounds as well as guaiacyl compounds.

It is preferable to have the alkali present in excess, sufficiently to keep the reaction mixture alkaline, and hydroxides of alkaline earth metals, such as calcium may be used, although best results have so far been obtained with alkali metals. The mercuric oxide is preferably in slight excess and, in any event, not less than enough to oxidize the lignin base present. The digesting temperature should be at least around the boiling point. By the use of a higher temperature under pressure (125°–175° C.) the reaction can be completed in a shorter time, and higher yields may be obtained. Good results have been obtained at 160° C.

When the alkaline reaction mixture is acidified after heating, we prefer sulfurous acid to other strong mineral acids such as sulfuric or hydrochloric. Sulfuric acid, for instance, causes the precipitation of more or less 5-hydroxymercurivanillin in the aldehyde fraction, and some of the other fractions also contain some mercury. Any such mercuric contamination is a double loss, first, in the mercury recoverable, and second, in the work of purifying the products themselves. Sulfurous acid immediately causes much of the mercury to separate in metallic form, and is effective to secure all the desired fractions without mercuric contamination, thus reducing the work of purification, and permitting full recovery of mercury.

The acid fraction obtained according to any of the examples given may advantageously be purified with neutral lead acetate as described in copending application of Irwin A. Pearl, Serial No. 536,039, filed May 17, 1944.

The process as a whole represents a large increase in the yields of vanillin and vanillic acid compared with processes previously known to us. But even more significant is the useful character of the other materials obtained according to the invention. These materials are crystalline in form and possess sweet aromatic aromas. Some of the fractions have a "juicy fruit" flavor, while another fraction has been obtained having a definite "maple" flavor. Present investigations have demonstrated many of these new compositions to have utility in various fields.

The ease with which the mercury may be recovered and reconverted into oxide for reuse in the process contributes to economy.

Without further elaboration the foregoing will so fully explain our invention, that others may readily adapt the same for use under various conditions of service.

We claim:

In the process of converting lignin into useful products in which lignin is digested in an aqueous alkaline reaction mixture in the presence of mercuric oxide, the improvement which consists in acidifying the alkaline reaction mixture with sulfur dioxide.

HARRY F. LEWIS.
IRWIN A. PEARL.

REFERENCES CITED

The following references are of record in the file of this patent:

UNITED STATES PATENTS

| Number | Name | Date |
|---|---|---|
| 2,057,117 | Sandborn et al. | Oct. 13, 1936 |
| 2,296,952 | Ross et al. | Sept. 29, 1942 |

OTHER REFERENCES

Pearl, "Jour. Am. Chem. Soc.," vol. 64, pp. 1429–1431 (1942).

Lautsch et al., "Angewandte Chemie," vol. 53, pp. 450–452.

Thorpe, "Dictionary of Applied Chemistry," 1928, vol. IV, Longmans Green & Co., p. 272.

Mellor, "Modern Inorganic Chemistry," 1939 ed., Longman, Green, & Co., p. 650.